United States Patent
Schliwa, I et al.

(10) Patent No.: US 10,822,086 B2
(45) Date of Patent: Nov. 3, 2020

(54) SYSTEM FOR HANDLING CONTAINERS AND OTHER OBJECTS IN A FREIGHT COMPARTMENT OF A VEHICLE

(71) Applicant: AIRBUS OPERATIONS GMBH, Hamburg (DE)

(72) Inventors: Ralf Schliwa, I, Hamburg (DE); Gunda Huelsen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 275 days.

(21) Appl. No.: 16/050,177

(22) Filed: Jul. 31, 2018

(65) Prior Publication Data
US 2019/0031349 A1    Jan. 31, 2019

(30) Foreign Application Priority Data
Jul. 31, 2017   (DE) .......................... 10 2017 117 326

(51) Int. Cl.
*B64D 9/00* (2006.01)
*B25J 9/00* (2006.01)
*B25J 15/00* (2006.01)
*B25J 9/16* (2006.01)
*B25J 15/08* (2006.01)

(52) U.S. Cl.
CPC .............. *B64D 9/00* (2013.01); *B25J 9/0084* (2013.01); *B25J 9/16* (2013.01); *B25J 15/0009* (2013.01); *B25J 15/0019* (2013.01); *B25J 15/08* (2013.01)

(58) Field of Classification Search
CPC ... B64D 9/00; B25J 9/0084; B25J 9/16; B25J 15/0009; B25J 15/0019; B25J 15/08; B65G 1/0478; B65G 1/06; B65G 1/1373
See application file for complete search history.

(56) References Cited

U.S. PATENT DOCUMENTS

| | | | | |
|---|---|---|---|---|
| 5,074,496 A | * | 12/1991 | Rezag | B64D 11/04 105/327 |
| 5,322,244 A | * | 6/1994 | Dallmann | B64D 11/04 244/118.1 |
| 5,496,000 A | * | 3/1996 | Mueller | B64D 11/0007 104/88.01 |
| 9,096,317 B2 | * | 8/2015 | Huber | B64D 9/00 |

FOREIGN PATENT DOCUMENTS

| | | | |
|---|---|---|---|
| DE | 102010013219 A1 | 9/2011 | |
| EP | 2815977 A1 * | 12/2014 | B65D 88/14 |

* cited by examiner

*Primary Examiner* — Kaitlin S Joerger
(74) *Attorney, Agent, or Firm* — Greer, Burns & Crain, Ltd.

(57) ABSTRACT

A system for handling containers in a freight compartment of a vehicle has a stowage device with a frame in which there are formed devices for receiving containers, at least one robot arm, each with a base a handling tool, a guide device mountable on the frame, and a control unit. The robot arm uses the handling tool to receive and move containers to and from the devices. The guide device moves the robot arm along at least one guide axis. On demand, the control unit actuates the robot arm(s) and the guide device such that a container is received from the respective device by the handling tool and is made available at a predetermined transfer position outside the frame, or such that a container is received by the handling tool at the transfer position and inserted into a device.

15 Claims, 6 Drawing Sheets

SYSTEM FOR HANDLING CONTAINERS AND OTHER OBJECTS IN A FREIGHT COMPARTMENT OF A VEHICLE

CROSS-REFERENCE TO PRIORITY APPLICATION

This application claims the benefit of, and priority to, German patent application number DE 102017117326.9, filed Jul. 31, 2017. The content of the referenced application is incorporated by reference herein.

TECHNICAL FIELD

Embodiments of the subject matter described herein relate generally to a system for handling objects, in particular containers, in a freight compartment of a vehicle. The embodiments also relate to an aircraft having a freight compartment and having, installed therein, a system for handling containers.

BACKGROUND

To maximize the number of passenger seats in a means of transport, in particular in a passenger aircraft, certain measures are widely used. Firstly, for example, the seat spacing between successive seats is optimized. A short depth extent of seat cushions can assist this. By means of skillful configuration of cabin monuments, it is secondly possible to create compact, multifunctional cabin monuments which, altogether, require a smaller structural volume than cabin monuments with separate functions. This leads to the possibility of installing additional passenger seats in the structural space that is thereby freed up.

A further possibility lies in reducing stowage space in particular for galleys or other general functions in the cabin. Here, so as not to restrict convenience, it is known for containers that are normally stored in a galley to be accommodated in a freight compartment outside the cavern. The conveyance of containers from a cabin of the aircraft into the freight compartment and vice versa can be ensured by means of various apparatuses which, altogether, enable on-board personnel to, upon demand, request containers, that is to say convey containers into the cabin, or stow containers, that is to say convey containers out of the cabin into the freight compartment.

Patent document DE 10 2010 013 219 A1 presents an example of a handling system of said type. Here, a storage apparatus positionable outside an aircraft cabin is presented, which storage apparatus has a very small height extent with multiple encircling conveying paths for containers. A drive device can perform conveyance of the individual movement paths in targeted fashion, such that a desired object passes to a transport apparatus or is transported away from said transport apparatus.

Patent document DE 43 02 706 C2 presents an arrangement for handling individual meals and beverages packaged in menu cartons, which are stored in a freight container and conveyed to a cabin.

Altogether, the outlay for the integration of a handling system in the manner of a logistics store is very great, and requires numerous modifications to the vehicle.

BRIEF SUMMARY

It is to be regarded as being an object of the disclosure to propose a handling system which can be integrated as easily as possible into the vehicle, requires the fewest possible modifications to the structure of the vehicle, and can be realized as inexpensively as possible.

The object is achieved by means of a handling system having the features of independent claim 1. Advantageous embodiments and refinements emerge from the subclaims and from the following description.

A system for handling containers in a freight compartment of a vehicle is proposed. The system has a stowage device with a frame in which there are formed multiple devices for receiving containers, at least one robot arm with at least four degrees of freedom, with a base and with a handling tool, a guide device which is mountable on the frame and which bears the base of the at least one robot arm and which has at least one guide axis, and a control unit which is connected to the at least one robot arm and to the guide device. The at least one robot arm is designed to use the handling tool to receive a container arranged in the frame and to remove said container from the respective device, or to insert a received object into a device. The guide device is designed to move the at least one robot arm along the at least one guide axis. The control unit is furthermore designed to, upon demand, actuate the at least one robot arm and the guide device such that an object is received from the respective device by the handling tool and is made available at a predetermined transfer position outside the frame, or that a container is received by the handling tool at the transfer position and inserted into a device.

The stowage device is consequently a three-dimensional structure which is equipped with devices that can receive containers. In a simple case, the devices may be stowage compartments in which the respective containers can be detachably held. The devices for receiving containers may also be kitchen appliances which can be laden with containers upon demand in order to perform warming, filling, emptying or disposal, or the like.

It is self-evident that the stowage device should be designed such that it can be readily accommodated in the available freight compartment of the respective vehicle. So as to satisfy the above description of the background of the invention, no modifications or as far as possible only minimal modifications should be necessary for accommodating the stowage device in the freight compartment. For example, it is conceivable for the stowage device to follow the external form of a freight container that is conventional for the respective vehicle. The stowage device may be installed as required or permanently.

In this context, it is pointed out that the expression "freight compartment" is not imperatively to be understood as a compartment for accommodating freight containers. Rather, in the context of the invention, a freight compartment is to be understood to mean a compartment which is used not for accommodating passengers but for the temporary storage of objects. This may in particular be arranged outside a passenger cabin. In passenger aircraft, this freight compartment may be arranged below a passenger cabin. An alternative to this is also above a passenger cabin, wherein a freight compartment of said type has a relatively small stowage volume or a relatively small structural height. It is furthermore conceivable for a freight compartment to the side of a passenger cabin to be used, in particular in the case of flying-wing aircraft or blended-wing body configurations.

The devices, that is to say for example the stowage compartments, in the frame are adapted to the containers to be stored. In particular in an aircraft, it could be expedient to provide so-called standard units as containers. It is conceivable for stowage compartments to also be designed for accommodating items of luggage, for example hand luggage, when required. The stowage device consequently does not imperatively need to provide stowage compartments or other devices of only a single size. Rather, it is conceivable and advantageous for stowage compartments and other devices with different sizes to be provided for accommodating containers of different size. It is furthermore conceivable for the stowage compartments and other devices to also be modifiable by means of modular components, for example in order to adapt their sizes or functions.

The frame may be realized in the form of an open frame of skeleton-type design, and may also have at least one closed wall. It may be advantageous for the frame to have at least one open boundary surface through which handling of containers stored in the frame is made possible. Said boundary surface, which will hereinafter also be referred to as first boundary surface, may exist in any spatial direction, that is to say may be arranged at a lateral, front/rear or top/bottom boundary of the frame. The directional statements may relate in particular to a coordinate system fixed with respect to the vehicle.

The at least one robot arm may have four or more degrees of freedom, and is consequently composed of at least two members that are connected to one another by means of rotary or thrust joints. The joints are in this case movable by means of in each case at least one drive, such that the robot arm can perform a three-dimensional movement in targeted fashion. The robot arm has a base which is positioned at an end of the robot arm situated opposite the handling tool. The base serves for holding the robot arm such that the latter can perform a predetermined movement relative to the base.

A particular feature lies in the guide device which bears the base and which is simultaneously designed to move the base along at least one guide axis. This has the particular advantage that the robot arm can perform a three-dimensional movement which is not exclusively dependent on its dimensions. Rather, the guide device is designed to predefine a position suitable for the handling of the desired container in the frame, such that the handling of the container is subsequently performed from said desired position.

The system consequently performs a sequence of movements until the handling of the respective container has been completed. After a desired position of the base has been assumed by the guide device, the movement of the robot arm is performed, which is subsequently followed by at least one further movement of the guide device and of the robot arm. It is conceivable for the guide device and the robot arm to assume a park position before and after the handling, in order to minimize the action of inertial forces caused by the movement of the vehicle.

The control unit is provided with suitable programming for actuating all of the actuators and drive devices in the guide device and the robot arm. The control unit accordingly forms an interface between an input unit or some other signal or data source in the vehicle and the actual actuation of the movement sequences by means of the stated components. In this context, it is conceivable that, upon demand, in order to issue a particular container, the control unit is capable of moving the guide device and the robot arm from a park position to the respective container, subsequently receiving the container, moving the container to a transfer position, and subsequently transferring the robot arm and guide device back into the park position.

It is furthermore conceivable for the control device to also have information regarding the individual containers, the storage position and filling states thereof, function and location of stowage compartments and other devices, such that a simplified command for issuing or receiving a container is transmitted to the system. This could for example be limited to merely the request for providing, receiving or handling a container with a particular content being transmitted to the system. The control unit would then be capable of identifying a suitable container, for example on the basis of a stored storage status or on the basis of identifiers on the containers, or identifying a free stowage compartment or other device with a particular function at which a container can be placed. The specific embodiment of the control unit may be dependent on the requirements of the vehicle operator, on the size of the frame, and on further factors.

Through the use of a robot arm which is commercially available in technically sophisticated form, the handling of containers in a freight compartment of a vehicle can be considerably simplified. The slim form of a robot arm also makes it possible, with adapted geometrical forms of the frame, for complex movement profiles for the handling of containers to be performed, without the need to make modifications to the freight compartment. The base may be positioned in advance by means of a guide device at a single open boundary surface of the frame, and greatly facilitates the positioning of the handling tool of the robot arm. Furthermore, it is not necessary for the robot arms to be designed to be so rigid that they exhibit particularly high approach accuracy under all conceivable influences owing to the vehicle movement. Rather, through the use of an intelligent controller, it is possible even in the case of relatively flexible robot arms for position deviations owing to inertial movements to be easily compensated by readjustment of the members and of the handling tool. In comparison with a conventional automated storage system, it is possible to realize a considerable weight saving, with simultaneously considerably greater flexibility of the storage or handling of containers.

In an advantageous embodiment, the frame has a first boundary surface at which the guide device is arranged. The at least one guide axis is oriented parallel to the first boundary surface. The first boundary surface could for example extend over an entire side of a frame, and the guide device could in this case position the base at a particular desired point along the extent of said side. The robot arm can consequently be positioned at any desired point in order to handle a desired container from there. If only a single movement axis is desired, this could be arranged centrally on the respective boundary surface, that is to say at the mid-point of the height or mid-point of the depth of the respective surface, depending on the orientation of the movement axis.

In a preferred embodiment, the guide device has at least two movement axes. The base can accordingly be positioned at any desired position at the open boundary surface, in order to handle the desired container from there. Here, the guide device could be composed of two mutually perpendicular individual guide apparatuses.

Particularly preferably, the guide device has three movement axes and is arranged between two groups of devices. The guide device is in this case consequently arranged in a gap between the two groups. The at least one robot arm can, by movement of the base, be moved to one of the two groups in order to perform handling there. It is thus possible to use a particularly large volume of a freight compartment without the need to use further, separate robot arms.

In one advantageous embodiment, the system has two groups of devices, which groups are each assigned a separate guide device. Containers in the two groups can be handled separately from one another. Furthermore, in this way, a certain redundancy can be realized, such that the robot arms of the guide device of one group can also handle containers of the other group. If, in a fault situation, a robot arm of one group has a defect, it would also be possible for maintenance of said robot arm to be performed in particular by a robot arm of the other group. For this purpose, use may for example be made of camera-based control.

The frame may preferably have a three-dimensional matrix of stowage compartments. All of the stowage compartments consequently form a sequence of multiple rows of stowage compartments arranged one above the other and/or one behind the other. It is thus possible for the geometric extent of the stowage device to be utilized, because the greatest possible storage of containers is made possible. Here, it must be ensured that adequate free spaces are provided for the movement of the robot arm, such that containers spaced apart from the guide device to a relatively great extent can be removed from or accommodated in respective stowage compartments by said robot arm. It is consequently conceivable for the stowage compartments to be designed in the manner of racks which are oriented in particular perpendicular to the first boundary surface, and between which an adequate movement space for the robot arm is provided. The corresponding free spaces are in this case arranged preferably perpendicular to the at least one movement axis of the guide device.

In an advantageous embodiment, the system has two or more robot arms, wherein the base of each robot arm is positionable independently by means of the guide device. Consequently, two or more robot arms can be positioned independently of other robot arms and can individually or jointly handle a particular container. The flexibility in the positioning of the individual containers and in the selection of the handling tool is improved.

In a further advantageous embodiment, at least one device is a device for processing and providing food products. The at least one robot arm is consequently capable of, upon demand, removing food products from such devices and making said food products available at the transfer position. Here, the devices may be of a wide variety of types. For example, it is conceivable for ovens or other heat-generating devices to be provided, in which pre-packed meals can be warmed upon demand, in order to then be made available outside the freight compartment by the handling system. The devices could also comprise coffee machines or similar appliances. The particular advantage lies in the yet further improved relocation of components outside a cabin of the vehicle for the yet further improved provision of structural space in a cabin of the vehicle. The at least one robot arm is consequently provided for filling said devices with food products, which are then processed, or for removing at least processed food products.

In one advantageous embodiment, the control unit is designed to actuate a first robot arm to remove a first container from a first stowage compartment and temporarily store said container, and to actuate a second robot arm to handle a second container of a second stowage compartment which is arranged behind the first stowage compartment as viewed from the guide device. To reach rear stowage compartments, there is consequently no need to provide corresponding gaps between individual racks of a stowage device for a robot arm to travel through, and the frame can be equipped with stowage compartments in gapless form. The temporary storage may be performed by simply holding the first container, or alternatively, it is also possible for the first container to be set down in a free position that is accessible to the guide device. If for example one, two, three or possibly more stowage compartments which normally remain unoccupied are available for the temporary storage, it is possible for two, three, four or more stowage compartments to always be arranged one behind the other and always be accessible after temporary storage.

In one advantageous embodiment, the handling tool is selected from a group of handling tools, the group comprising a receiving element with a bearing surface, at least one finger-like member, and at least one hook. The bearing surface may for example be arranged on a flat receiving element which can be slid under a container. After the bearing surface has been slid under, the handling tool can consequently be raised counter to the force of gravity, such that the container lies with its entire weight on the bearing surface. The container can then be moved by movement of the bearing surface. To assist the holding of the container on the bearing surface, it may be expedient for locking elements to be provided which latch into corresponding devices of the container. Alternatively or in addition, it is also conceivable for an electromagnet to be provided in the receiving element, which electromagnet can realize a temporary connection between the bearing surface and the container. For this purpose, it is self-evidently necessary for the container to have a corresponding magnetic underside.

The handling tool may furthermore be designed as a multi-member gripping tool, which for example resembles a human hand. The gripping tool may consequently have multiple finger-like gripping elements, which are movable independently of one another. A gripping tool of said type may form a bearing surface as mentioned above. It is however particular preferable for the gripping tool to replicate a gripping movement of a human user gripping a container and moving it to another location. This may be advantageous in particular if standard containers are used in the vehicle, for example "standard units", which are designed for handling by a human user. A modification of the containers is consequently not necessary even with the use of the system according to the invention.

The handling tool may also be designed as a hook which can be hooked into existing handles of a container. It is self-evidently also possible for combinations of multiple handling tools to be provided. Furthermore, the use of robot arms with different handling tools on a single guide device is conceivable.

The disclosure furthermore relates to a vehicle having a freight compartment and having a handling system formed therein. It is particularly preferable for a passenger cabin to be arranged below or above the freight compartment and to have a transfer device which at least partially adjoins the transfer position. The transfer device may in the simplest case be an opening in a boundary surface to the passenger cabin, or a type of compartment which contains the transfer position and into which the respective robot arm places a requested container. Said transfer compartment should then be accessible from the cabin.

In one advantageous embodiment, the freight compartment is arranged below the passenger cabin and is separated from the passenger cabin at least by a cabin floor. In the cabin floor, there is arranged an opening through which the transfer position can be accessed from the cabin. The transfer position may, as mentioned above, be arranged in a transfer compartment, which is situated for example below the opening in the cabin floor. Said opening is preferably closable by means of a closure device, or is accommodated at a location where inadvertent entry is reliably prevented.

Such a position may for example be within a compartment of a galley, which compartment is itself closable by means of a flap or a door.

In a further advantageous embodiment, the freight compartment is arranged above the passenger cabin, in particular in a region above a galley. This region is, in passenger aircraft, normally referred to as "crown area", and may, depending on the structural form of the aircraft, have a corresponding structural space for accommodating the frame.

If the freight compartment below a passenger cabin is equipped with the handling system according to the invention, the frame may for example have the external shape of a standard container or of a half-size standard container. It is conceivable for the frame to be fully equipped with the guide device and with the at least one robot arm and to be insertable into the aircraft as required, and to merely have to be connected to an electrical system and to a data line after being inserted. Consequently, as required, an aircraft can be reconfigured such that, for example in the case of a more compact seating configuration, additional storage space for food products and the like is made available.

Both for the system and the vehicle, it is particularly advantageous if the content of a stowage device can be filled and emptied via the freight compartment without the need for the stowage device to be removed for this purpose. If, for example, the stowage device, or the handling system adapted to the form of a standard container, is arranged directly at a freight door of the aircraft, then the removal or introduction of the stored content would be possible via the freight door. This could be carried out in the form of insertable modules.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses will emerge from the following description of the exemplary embodiments and from the figures. Here, all of the features described and/or illustrated in the figures, individually and in any desired combination, form the subject matter of the disclosure even independently of their composition in the individual claims or the back-references thereof. Furthermore, in the figures, the same reference designations are used for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
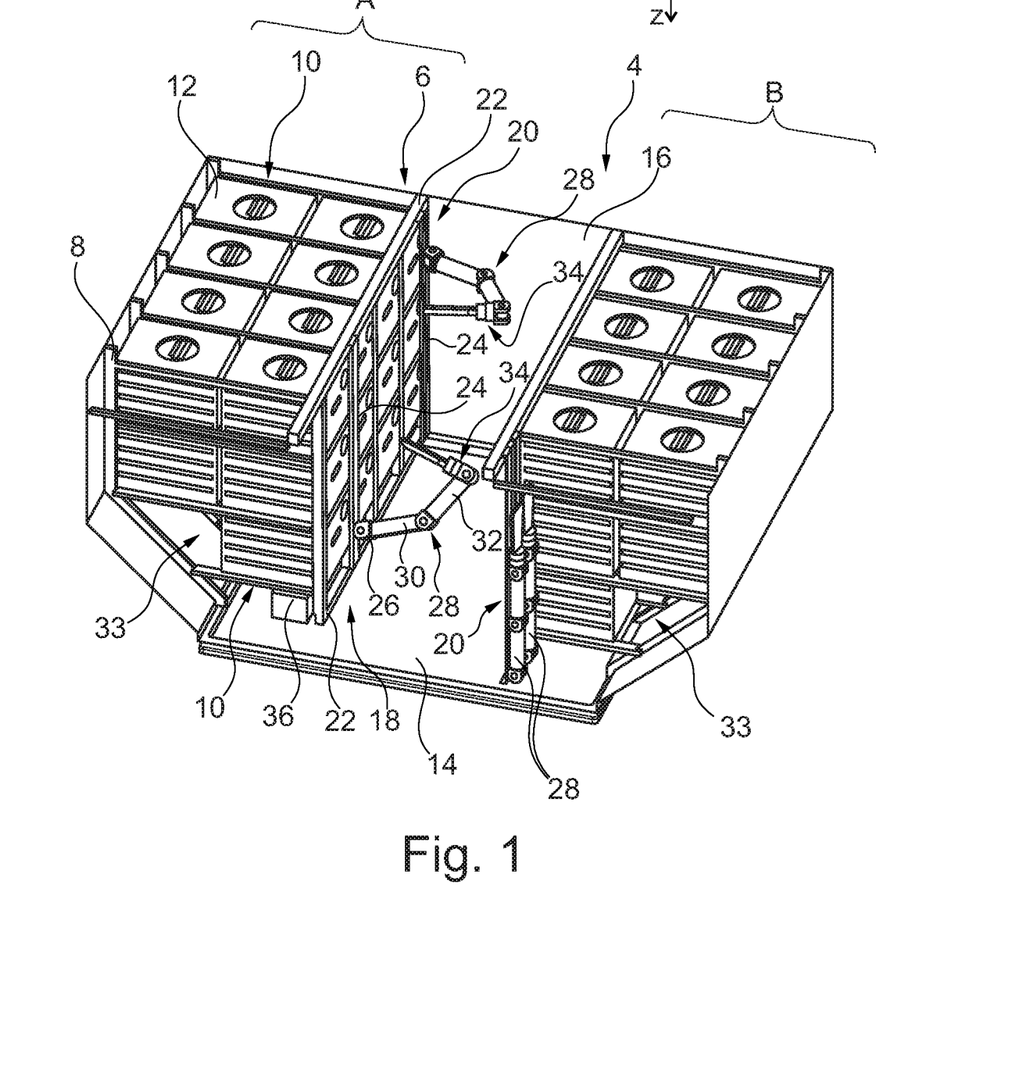
FIG. 1 shows a handling system in a freight compartment in a three-dimensional illustration.

FIG. 1 shows a handling system 2 in a three-dimensional illustration. The handling system 2 is shown by way of example in a freight compartment 4 of a passenger aircraft, and altogether follows the external shape of a standard container. For explanation of the handling system 2, one half, which is illustrated on the left in the plane of the drawing, will be discussed in more detail.

The system 2 has a stowage device 6 with a frame 8 in which multiple stowage compartments 10 for detachably holding containers 12 are formed. The frame 8 may determine the external shape of the stowage device 6. In the illustration shown, with a stowage device 6 divided into two halves, use may be made of two separate frames 8. Here, a first group A of stowage compartments 10 and a second group B of stowage compartments 10 are formed. The two groups A, B may be arranged on a common floor surface 14 and/or encased by a common container casing 16.

The frame 8 has, by way of example, a first boundary surface 18 situated on the inner side, at which a guide device 20 is arranged. The guide device 20 has, by way of example, two horizontally oriented rails 22 which are arranged parallel to one another and which are fastened to a bottom side of the frame 8 and to a top side of the frame 8. On the rails 22, there is arranged a carrier 24 running perpendicular thereto, which carrier is movable by means of a first drive device (not illustrated here) along the rails 22.

The carrier 24 bears a base 26 of a robot arm 28 and can displace said base along the extent of the carrier 24. Altogether, it is consequently possible for the robot arm 28 to be arranged at any desired position of the first boundary surface 18.

The robot arm is composed for example of two members 30 and 32, which are connected to one another in articulated fashion. On a side of the robot arm 28 arranged opposite the base 26, there is arranged a handling tool 34. Said handling tool is designed to handle a container 12, that is to say to remove said container from, or convey said container into, a respective stowage compartment 10.

Also shown is a second robot arm 28 which is designed in the same way as the first robot arm 28 and which is arranged on an individual carrier 24 of the guide device 20. The two carriers 24 can separately and independently of one another position the robot arm 28 respectively fastened thereto in space, as long as the movements of the two carriers 24 do not impede one another. To prevent this, it would be possible for the two carriers 24 to be mounted on different sides of the rails 22. For this purpose, it would then be necessary for the rails 22 to be spaced apart somewhat from the first boundary surface 18, in order that one of the two robot arms 28 can be moved between the guide device 20 and the stowage compartments 10.

The illustration shows predominantly two stowage compartments 12 arranged one behind the other, such that, by means of an arrangement of multiple stowage compartments 10 one above the other, a three-dimensional matrix of stowage compartments 10 is formed. By removing a container 12 that is situated at the first boundary surface 18, a stowage compartment 10 arranged therebehind can be accessed. It is for example conceivable for one of the two robot arms 28 to withdraw a container 12 situated at the boundary surface 18 from the respective stowage compartment 10, and for the other robot arm 28 to subsequently receive the container 12 that is held in the stowage compartment 10 arranged therebehind. The temporarily stored container 12 can thereafter be inserted into a stowage compartment 10 again.

The embodiment of the handling system 2 may be restricted to one such half, but in the situation shown, two halves of identical design, with two groups A and B of stowage compartments 10, are illustrated. It may be expedient to use a single guide device 20 for both groups A and B. For this purpose, it would be necessary for the guide device 20 to permit a movement along a third movement axis, which lies in a connecting line between the two halves or groups A and B. For this purpose, it would for example be possible for the rails 22 to be mounted displaceably on a floor surface and on a ceiling surface, such that the robot arms 28 can handle containers 12 of group A or of group B as required. In the illustration shown, however, two separate guide devices 20 are shown, which are assigned to in each case one group A or B.

At the group B, in the lower left corner in the plane of the drawing, it is illustrated that two robot arms 28 are in a park position. Should a defect arise in the robot arms 28, which are in movement, of the group A while said robot arms are not in a park position, it would be possible for maintenance to be performed on these by means of the robot arms 28 of the group B. It would be conceivable for a jammed or defective robot arm 28 to be freed from an obstructed position, or at least moved into the vicinity of a park position. It is conceivable, for the purposes of maintenance, to use camera-based manual control, by means of a screen or virtual reality glasses. It would then be possible for the defective robot arms 28 to be placed into a passive state, such that it remains in a park position without expenditure of force. The control unit 36 may for example provide a maintenance mode of said type. By means of such a dual arrangement of two guide devices 20 with respectively separate robot arms 28, it is also possible, by means of a takeover of the function of one of the two groups shown, for a system as shown to maintain an emergency operating mode without significant limitations. This is not possible in the case of a conventional system.

For the actuation of the guide device 20 and of the robot arms 28, a control unit 36 is merely schematically indicated, which control unit is connected to the guide device 20 and to the robot arms 28. The position of the control unit 36 is however selected merely by way of example; any other suitable installation locations may be correspondingly selected by a person skilled in the art in accordance with the respective requirements. The integration of the control unit 36 into a closed wall 16 could however be advantageous, because the entire handling system 2 can then be inserted into the vehicle or aircraft as required, without the need to perform further modifications other than the fastening, the electrical supply and a data connection.

For example, use may be made of system connections in triangular regions 33 in a lateral, lower region of a freight compartment, such as are commonly provided in passenger aircraft. This greatly reduces the outlay in terms of modification to the vehicle for the integration of the system according to the invention. In the triangular regions 33, there may also be provided cooling assemblies for cooling the containers 12. The waste heat generated here can be released into the rest of the freight compartment, where it can be discharged by means of the freight compartment ventilation or air-conditioning system.

Furthermore, because the system does not constitute a cabin, an existing halon fire extinguishing system may be used, such that no further modifications are required for this purpose either.

Figure 2A:
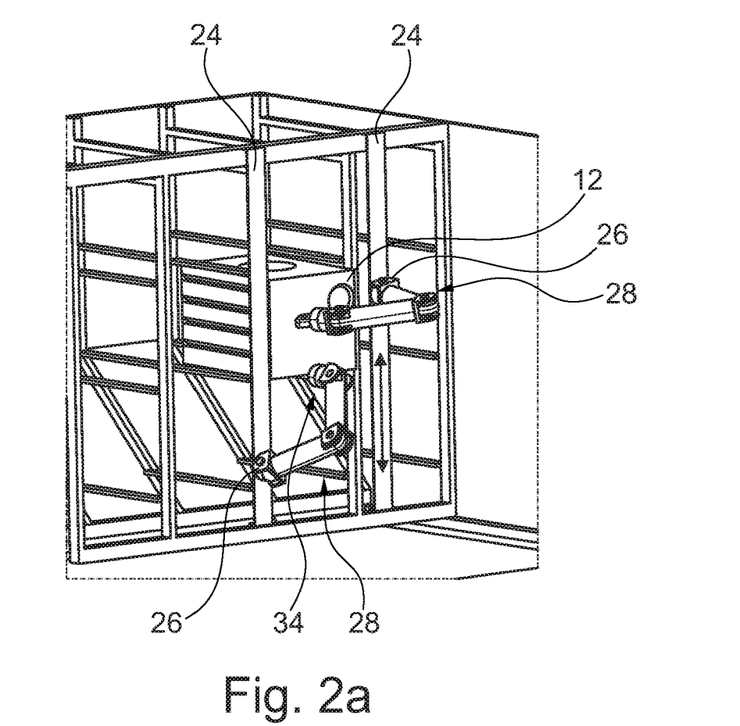
FIGS. 2a and 2b show the handling of a container in two successive three-dimensional illustrations.
Figure 2B:
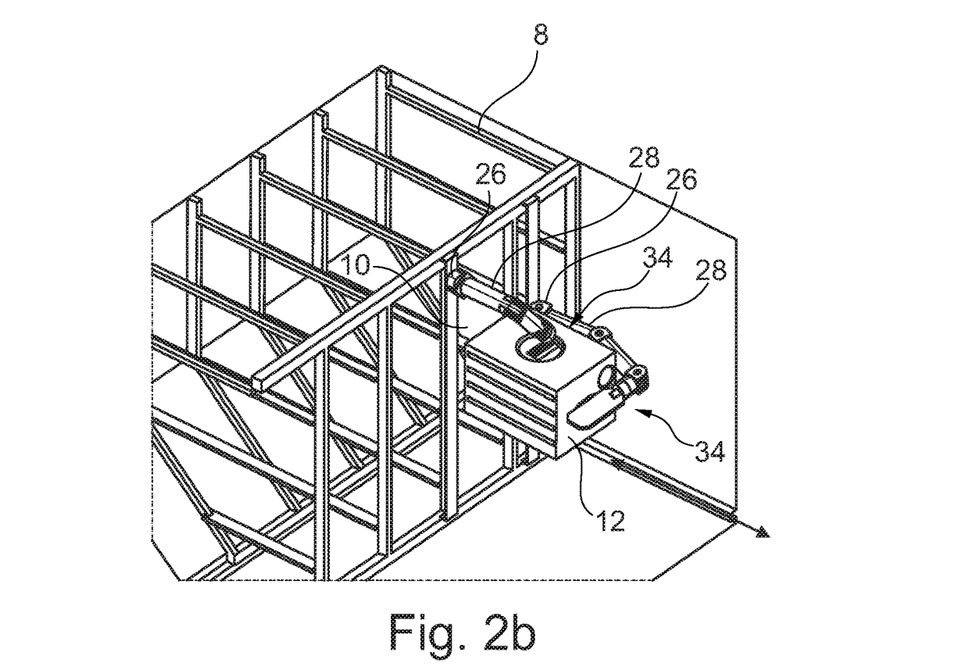

FIGS. 2A and 2B show the process of the handling of a container 12 by means of two robot arms 28 simultaneously. For this purpose, the two carriers 24 are positioned as close as possible to the respective container 12. In the illustration shown in FIGS. 2A and 2B, one carrier 24 is arranged on one side adjacent to the container 12, whereas the other carrier 24 is positioned on the opposite side of the container 12. The respective base 26 of the two robot arms is subsequently moved along the respective carrier 24 such that the handling tools 34 can be moved conveniently to the respective container 12.

Figure 3A:
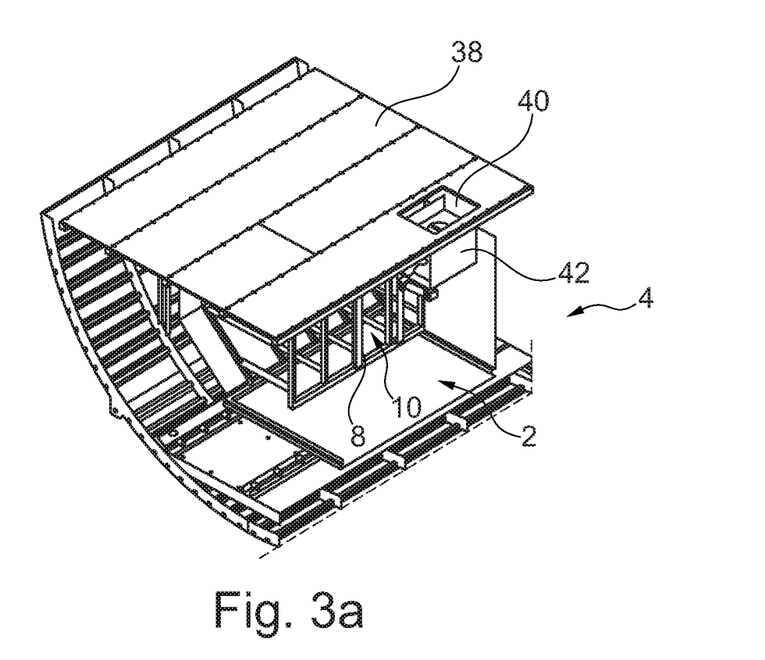
FIGS. 3a and 3b show the transfer or receiving of a container by the handling system.

FIG. 3A illustrates a part of the handling system 2 below a cabin floor 38. The handling system 2 is consequently arranged in a freight compartment 4 of an aircraft below a passenger cabin. For example, a galley may be arranged directly above the handling system 2, for which galley the individual containers 12 can be made available or from which galley the respective containers 12 are received. For the access to the containers 12 to be handled, an opening 40 is provided in the cabin floor 38, the underside of which opening is adjoined by a transfer device 42. Said transfer device may be designed as a type of compartment with two mutually spaced-apart setting-down frames 44, which enclose a gap 46 between them, which gap allows a robot arm 28 to pass through. A container 12 placed on the setting-down frames 44 is accessible both from the cabin and from the freight compartment.

Figure 3B:
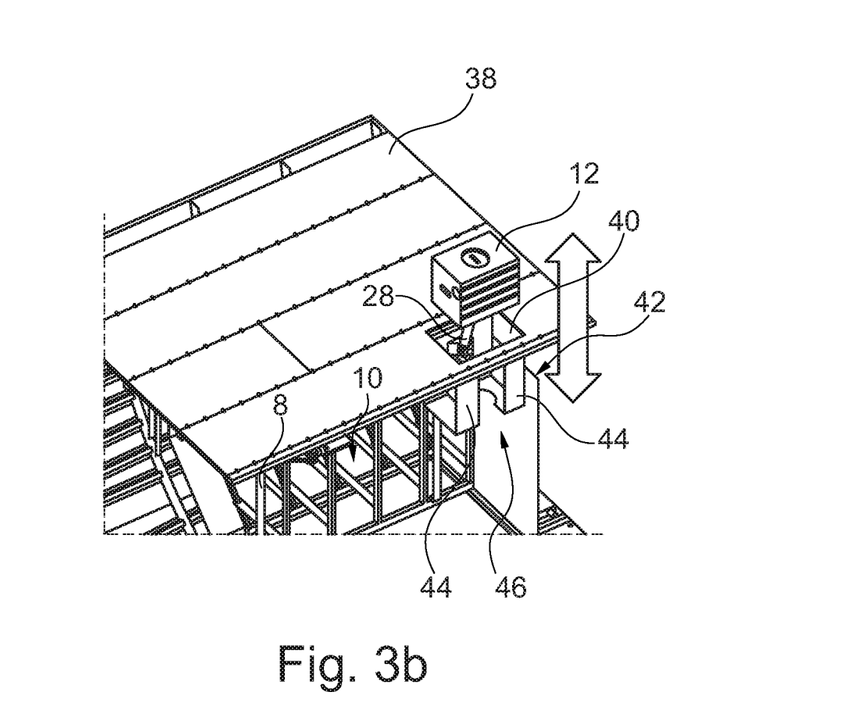

It is consequently made possible for the handling system 2 to withdraw a container 12 from a stowage compartment 12 and, by combined movement of the robot arm 28 and of the guide device 20, position the respective container 12 in the transfer device 42. As illustrated in FIG. 3B, the container 12 may if required even be raised slightly above the cabin floor 38. Likewise, a user can however also make a container 12 available at the transfer device 42, which container is then withdrawn by the handling system 2 of the transfer device 42 and set down in an intended or free stowage compartment 10.

Figure 4A:
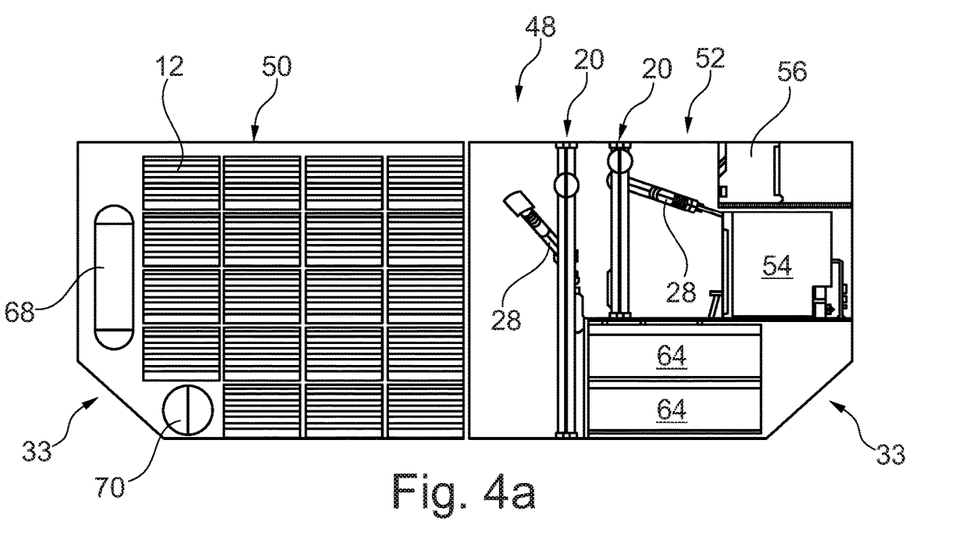
FIGS. 4a, 4b, 5a and 5b show a handling system with additional devices for processing food products.

FIG. 4A shows a further exemplary embodiment of a handling system 48, which is equipped with a stowage device 50 and with a device 52 for processing and providing food products. The device 52 substantially constitutes a fully automatic kitchen which is operated by means of the robot arms 28. As can be seen in FIGS. 4a to 5b, these are designed by way of example as ovens 54, coffee machines 56, cooler/freezer units 58, dishwashers 60, a waste compactor 62, multiple drawers 64, and a device 66 for the discharge of liquid waste. Here, the individual robot arms 28 can for example introduce packaged meals into an oven 54 such that these are warmed. The warmed meals are subsequently made available within the cabin. In this way, a considerable structural space within the cabin can be saved, because the device 52 can readily be laden and operated in automated fashion.

Figure 4B:
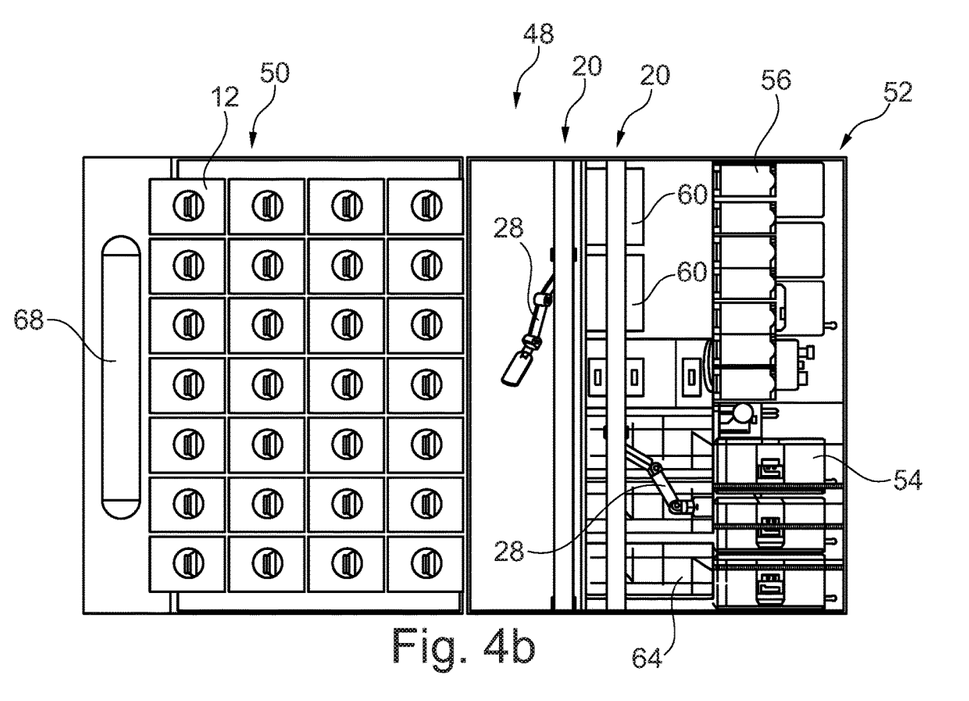
Figure 5A:
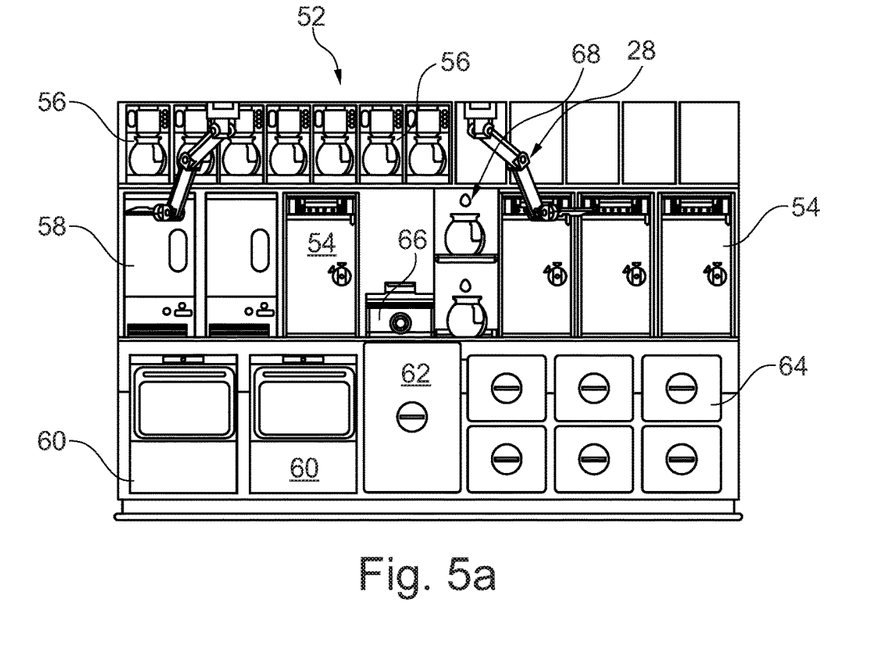
Figure 5B:
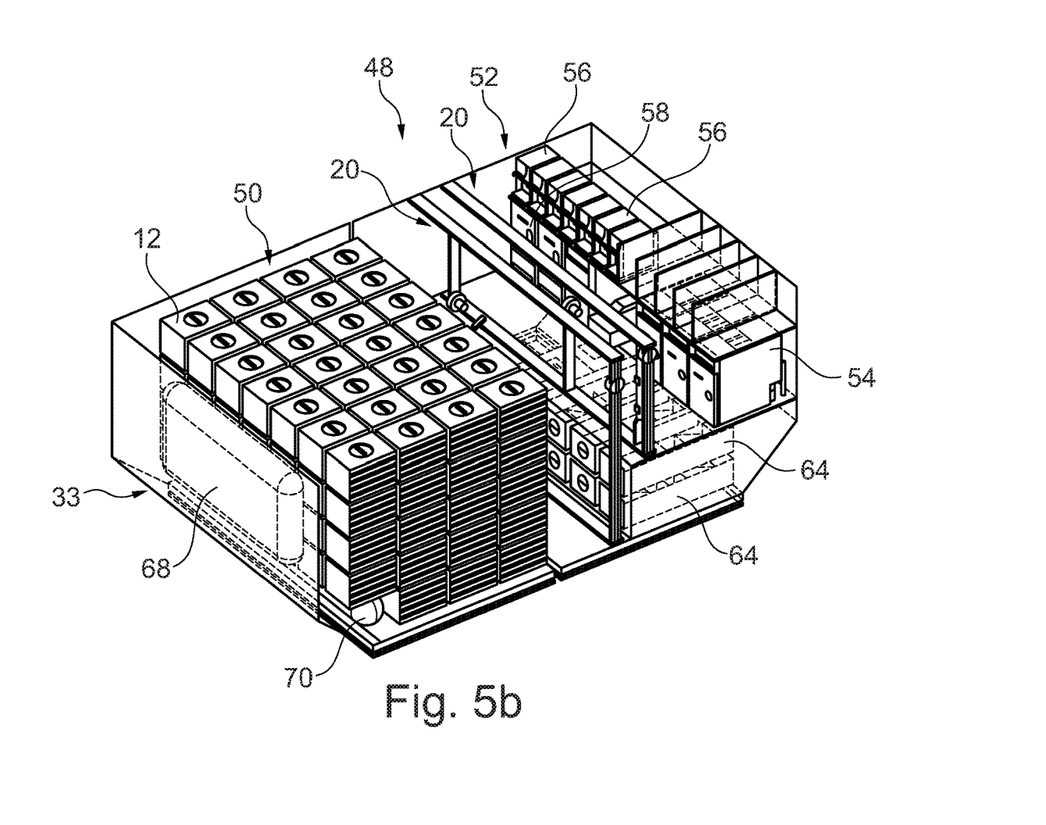

FIGS. 4a, 4b and 5b furthermore show a flat water tank 68 above the triangular region 33, which water tank can in particular supply freshwater or drinking water to the device 52. Also arranged in the triangular region 33 is a cooling appliance 70 which serves for cooling the containers 12 of the stowage device 50.

Figure 6:
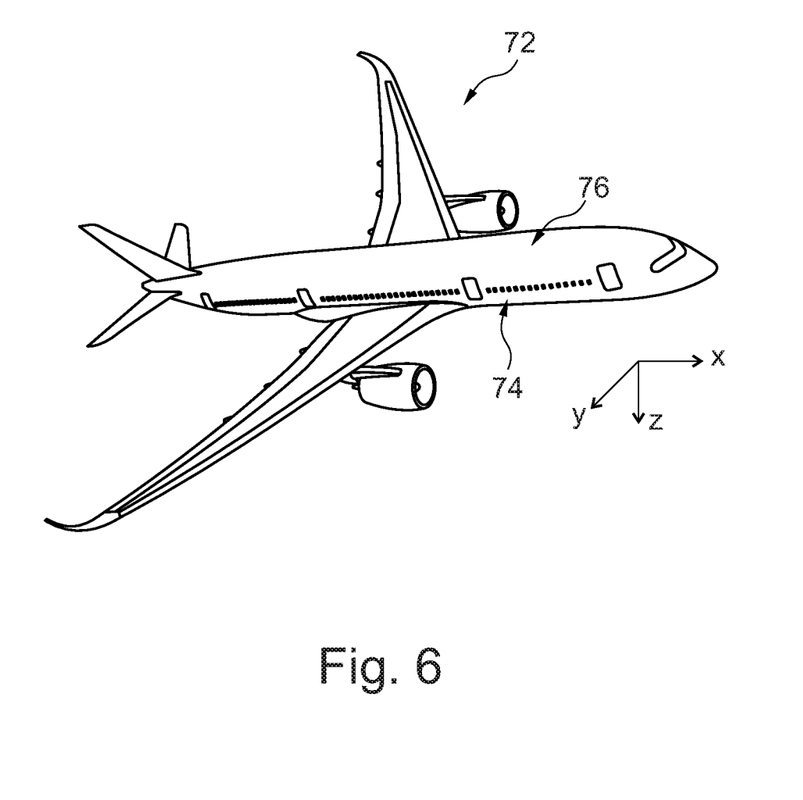
FIG. 6 shows an aircraft with a cabin, with a freight compartment and with a handling system installed therein, in a three-dimensional illustration.

Finally, FIG. 6 shows an aircraft 72 with a freight compartment 74, a cabin 76 situated above said freight compartment, and a handling system 2 or 48 according to the preceding description arranged in the freight compartment 74.

It is additionally pointed out that the expression "having" does not rule out other elements or steps, and the expressions "a" or "an" do not rule out a multiplicity. It is also pointed out that features that have been described with reference to one of the above exemplary embodiments may also be used in combination with other features of other exemplary embodiments described above. Reference designations in the claims are not to be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for handling containers in a freight compartment of a vehicle, the system comprising:
    a stowage device with a frame in which there are formed multiple devices configured to receive containers;
    a robot arm with at least four degrees of freedom, the robot arm comprising a base and a handling tool;
    a guide device which is mountable on the frame and which bears the base of the robot arm, the guide device having at least one guide axis; and
    a control unit connected to the robot arm and to the guide device;
    wherein the robot arm is configured to use the handling tool to receive a container arranged in the frame, to remove the container from a respective one of the devices, and to insert a received object into a respective one of the devices;
    wherein the guide device is configured to move the robot arm along the at least one guide axis; and
    wherein the control unit is configured to, upon demand, actuate the robot arm and the guide device such that a container is received from the respective device by the handling tool and is made available at a predetermined transfer position outside the frame, or such that a container is received by the handling tool at the transfer position and inserted into a respective device.

2. A system according to claim 1, wherein the frame has a first boundary surface at which the guide device is arranged, and wherein the at least one guide axis is oriented parallel to the first boundary surface.

3. A system according to claim 1, wherein the guide device has at least two guide axes.

4. A system according to claim 3, wherein the guide device has three guide axes and is arranged between two groups of devices.

5. A system according to claim 1, and having two groups of devices, which groups are each assigned a separate guide device.

6. A system according to claim 1, wherein the frame has a three-dimensional matrix of stowage compartments.

7. A system according to claim 1, comprising two or more robot arms, wherein a base of each robot arm is positionable independently by the guide device.

8. The system according to claim 7, wherein the control unit is configured to actuate a first robot arm to remove a first container from a first stowage compartment and temporarily store the first container, and to actuate a second robot arm to handle a second container of a second stowage compartment arranged behind the first stowage compartment relative to the guide device.

9. The system according to claim 1, wherein at least one device comprises a device for processing and providing food products.

10. The system according to claim 1, wherein the handling tool is selected from a group of handling tools, the group comprising:
    a receiving element with a bearing surface;
    at least one finger-like member; and
    at least one hook.

11. A vehicle comprising:
    a vehicle fuselage comprising a passenger cabin formed therein;
    a freight compartment; and
    a handling system arranged in the freight compartment, the handling system comprising:
        a stowage device with a frame in which there are formed multiple devices configured to receive containers;
        a robot arm with at least four degrees of freedom, the robot arm comprising a base and a handling tool;
        a guide device which is mountable on the frame and which bears the base of the robot arm, the guide device having at least one guide axis; and
        a control unit connected to the robot arm and to the guide device;
    wherein the robot arm is configured to use the handling tool to receive a container arranged in the frame, to remove the container from a respective one of the devices, and to insert a received object into a respective one of the devices;
    wherein the guide device is configured to move the robot arm along the at least one guide axis; and
    wherein the control unit is configured to, upon demand, actuate the robot arm and the guide device such that a container is received from the respective device by the handling tool and is made available at a predetermined transfer position outside the frame, or such that a container is received by the handling tool at the transfer position and inserted into a respective device.

12. A vehicle according to claim 11, wherein:
    the freight compartment is arranged below the passenger cabin and is separated from the passenger cabin at least by a cabin floor; and
    the cabin floor has an opening through which the transfer position can be accessed from the passenger cabin.

13. A vehicle according to claim 11, wherein the freight compartment is arranged above the passenger cabin in a region above a galley.

14. A vehicle according to claim 11, wherein the frame has an external shape of a standard container or of a half-size standard container.

15. A vehicle according to claim 11, wherein the vehicle is a passenger aircraft.

* * * * *